United States Patent [19]
Rich et al.

[11] 3,779,290
[45] Dec. 18, 1973

[54] APPARATUS FOR UNTWISTING AND STRIPPING TWISTED WIRE PAIR LEADS

[75] Inventors: Dennis E. Rich, Phoenix; Robert O. Crump, Scottsdale, both of Ariz.

[73] Assignee: Honeywell Information Systems, Inc., Waltham, Mass.

[22] Filed: Sept. 28, 1972

[21] Appl. No.: 293,291

[52] U.S. Cl. ................... 140/1, 81/9.51, 140/149
[51] Int. Cl. ................................ B21f 21/00
[58] Field of Search .................. 140/1, 71, 149; 81/9.5 A, 9.51

[56] References Cited
UNITED STATES PATENTS
2,929,286    3/1960    Blakely ..................... 81/9.51

*Primary Examiner*—Lowell A. Larson
*Attorney*—Dudley T. Ready et al.

[57] ABSTRACT

A rotatable wire guiding assembly is provided which at one end receives a twisted wire pair fed thereto and at the other end fits with a grooved conical separator element that has a saddle shaped tip. Attached to the wire guiding assembly is a cutter-stripper assembly which includes an insulation cutter and a set of plates that grip insulation for stripping. Actuators drive the wire cutting and stripping elements and a motor drives the rotatable wire guiding assembly and a pair of wire feed rollers.

4 Claims, 13 Drawing Figures

PATENTED DEC 18 1973 3,779,290
SHEET 1 OF 5
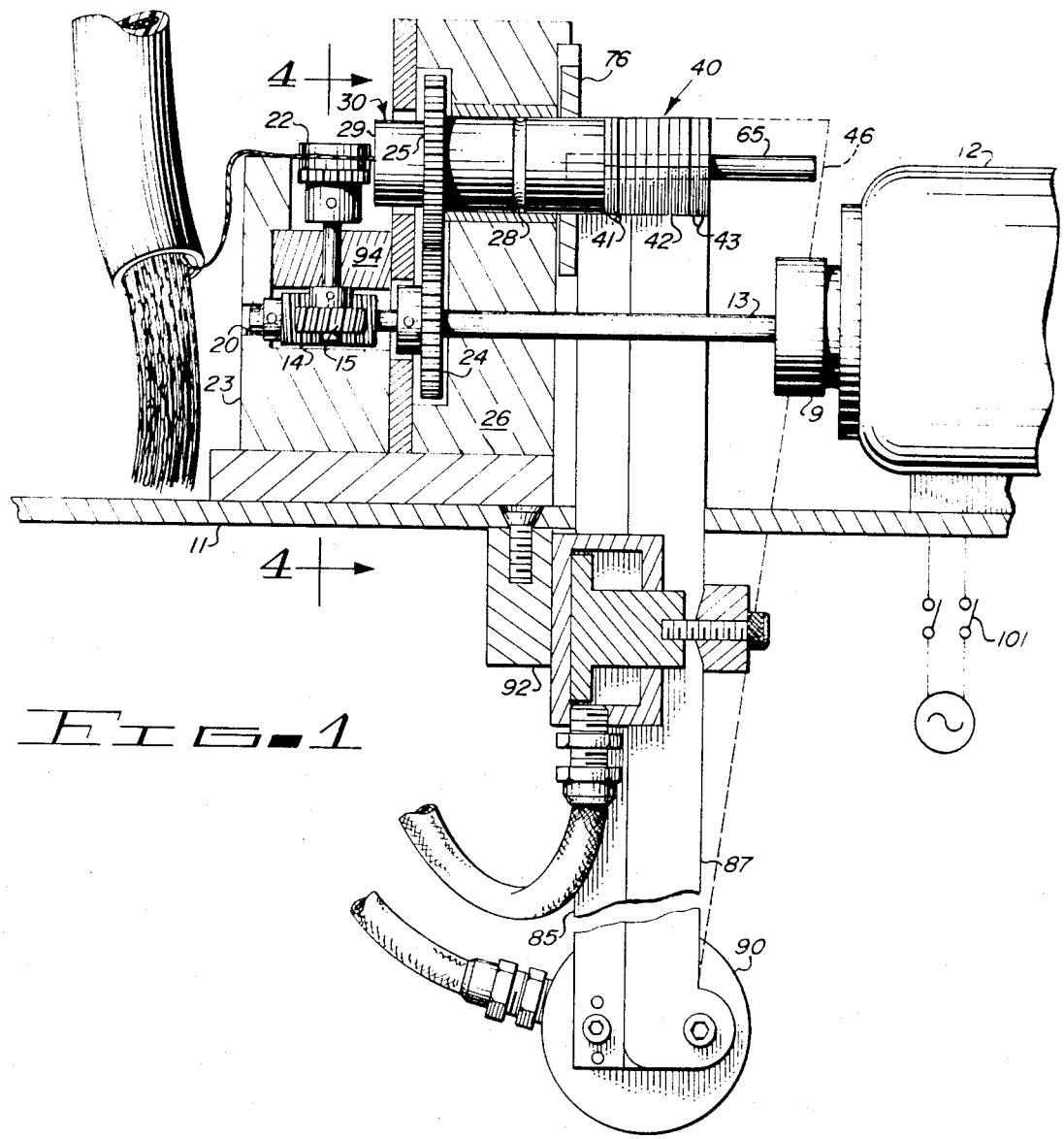
Fig-1
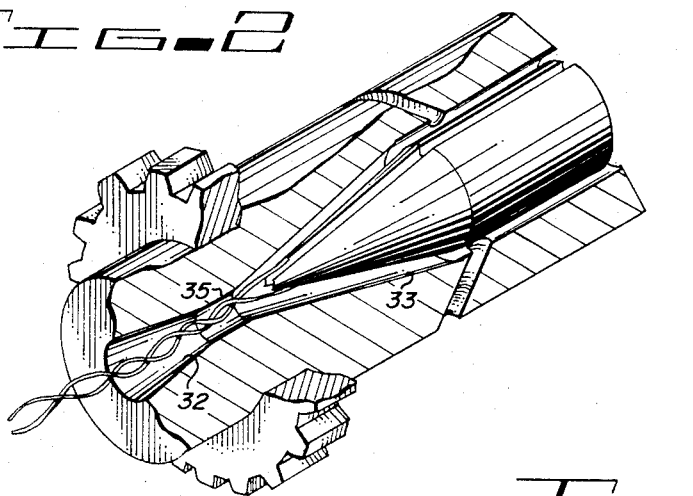
Fig-2
Fig-3

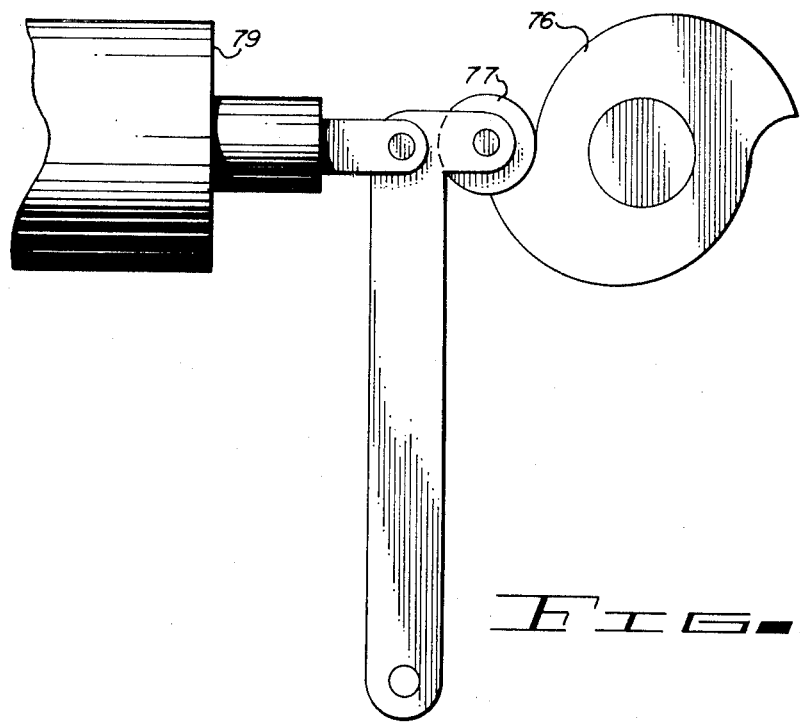
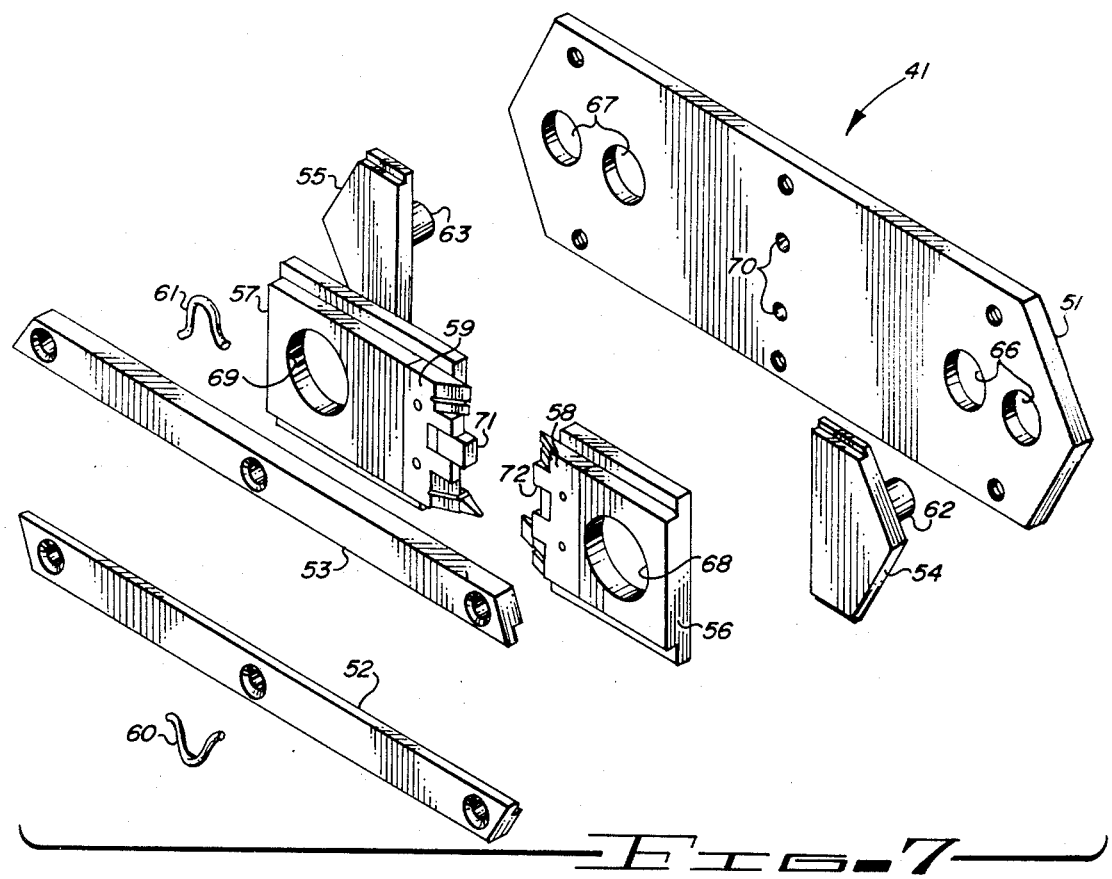

APPARATUS FOR UNTWISTING AND STRIPPING TWISTED WIRE PAIR LEADS

FIELD OF THE INVENTION

This invention relates to electrical wire preparation and in particular relates to a machine for untwisting end portions of twisted wire pairs and stripping insulation from each end portion so that electrical connections can be made to the twisted wire pair. It is particularly useful in preparing cables having approximately 50-100 pairs of tin coated twisted wires, approximately 30 A.M.G. in size, for use in computer systems.

DESCRIPTION OF THE PRIOR ART

The standard method of preparing twisted wire cables consists of three basic steps: (1) manually untwisting the ends of each twisted pair, (2) cutting the insulation for the desired length of exposed ends, and (3) pulling off the unwanted insulation. This process, particularly for thin copper wires, approximately 0.01 inches in diameter, is difficult, slow and costly to perform. A major problem is breakage of the wires. Normally, the length of the twisted wire pair is critical so that when one wire is broken the twisted pair must be discarded. For this reason, several spare twisted wire pairs are usually provided in each cable to allow for breakage. Even with the provision of spare pairs, it is not unusual to have a cable scrapping rate exceeding 50 percent. Furthermore, with the apparently successfully prepared wire cables, latent defects may exist. For example, the tin coating on the wires (which is important for subsequent soldered connections) may be stripped off with the insulation. Also, a wire may be deformed so that it is weakened to the point whereby it may later break.

A problem which particularly arises in stripping insulation from fine wires is the tendency of the insulation to bunch up and oppose the movement of the insulation relative to the wire. This effect is more frequent when wires are twisted into wire pairs, which causes the insulation to be stretched. Stripping then becomes quite difficult and results in wire breakage and tin plating being removed.

Accordingly, it is an object of the invention to provide a machine which semiautomatically untwists a wire pair and prepares the ends for subsequent electrical connections.

It is a further object of the invention to limit the amount of insulation lumping permitted in a wire stripping and untwisting machine.

SUMMARY OF THE INVENTION

It has been discovered that a machine can be provided which performs the three steps of twisted pair wire preparation in essentially a single semiautomatic operation that is more accurate, faster and more reliable than manual wire preparation. A twisted wire pair preparation device is provided which includes a saddle tipped conical separator member having wire receiving grooves extending lengthwise which reliably separates the wires of a wire pair. A rotatable wire guiding cylinder has a conical opening at one end, which mates with the conical separator member, and has a channel connecting with another coaxial conical opening at the other end for receiving a twisted wire pair. A pair of rollers are provided for feeding the wire pair into the conical opening of the wire guiding cylinder. A pair of channels in a cutter-stripper assembly receive the ends of the wire pairs after passing through the wire guiding block and holds them in a position whereby an insulation cutter is adjacent to the wire stripping point. The feed rollers and the wire guide cylinder are driven at relative speeds appropriate for the twist ratio, and after the wire pair is fed through the cutter-stripper assembly, the insulation cutter is actuated. Gripper elements, constructed so as to avoid insulation bunching, and an actuator are provided to strip the severed insulation.

BRIEF DESCRIPTION OF THE DRAWINGS

FIG. 1 is a side elevation view of a preferred embodiment of the invention. FIG. 2 is a perspective view of the separator element in the FIG. 1 device, partially sectioned. FIG. 3 is an end view of the separator element of FIG. 2. FIG. 6 is an end view of the centering mechanism of the device of FIG. 1. FIG. 7 is an exploded view of the cutter element used in the FIG. 1 device.

DESCRIPTION OF A PREFERRED EMBODIMENT OF THE INVENTION

Figure 4:
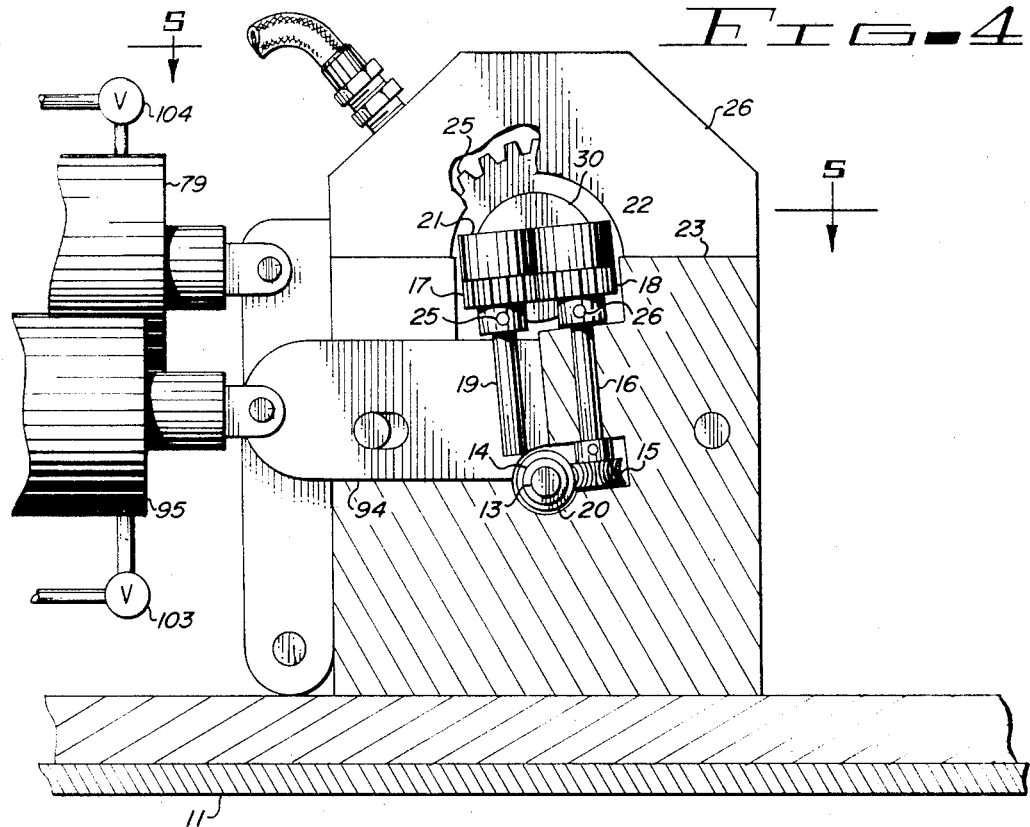
FIG. 4 is an end view of the device of FIG. 1 sectioned along 4—4.

Conveniently, a rigid base plate 11 (FIG. 1) provides a platform for supporting the untwisting and stripping apparatus. Power is supplied by a motor 12 which drives shaft 13 that extends into a bearing 20 in end plate 23. The end portion of drive shaft 13 is a worm gear 14 which drives gear 15 (FIG. 4) on shaft 16. A feed roller 22 is affixed to shaft 16 and therefore is driven by motor 12. By means of gear 18, affixed to shaft 16, which engages gear 17, affixed to shaft 19, feed roller 21 is driven in synchronism with the mating feed roller 22.

Also affixed to drive shaft 13 is a gear 24 which drives gear 25 affixed to wire guide cylinder 29 in wire guiding assembly 30, that is rotatably mounted on the intermediate block 26 which is affixed to base plate 11. The wire guide cylinder 29 (FIG. 5) has a conical wire guiding indentation 32 constituting a wire pair receiving opening, a conical indentation 33 conforming to the separator element 36, and a passageway 35 interconnecting the indentations for permitting a twisted wire pair to pass through the wire guide cylinder 29. The separator element 36 is shown in greater detail in FIGS. 2 and 3 in which longitudinal grooves 37 and 38, in conjunction with the conical indentation 33, guide the ends of separated wire pairs. A flat surface 39 is provided so that a set screw through wire guide cylinder 29 fixes separator element 36 thereto. The tip 36A of separator element is indented to form a saddle shaped surface which is essential for reliable wire separation.

For insulation cutting and wire trimming, cutter-stripper assembly 40 is mounted on and adjacent to wire guiding assembly 30. This assembly 40 includes an insulation cutter 41, spacers 42 and wire cutter 43, shown in greater detail in FIGS. 7 and 8. The insulation cutter 41 has a support plate 51 on which slide forming grooves are provided by flanged guide elements 52 and 53. End stop elements 54 and 55 are placed at opposing ends of the grooves formed by guide elements 52 and 53. The end stop elements abut respective blade holders 56 and 57, which are in the same grooves, and have outside surfaces for mating with actuators. Spring elements 60 and 61 are arranged to bias apart the blade holders 56 and 57 upon which the respective insulation cutter blades 58 and 59 are mounted. Studs 62 and 63, on elements 54 and 55, together with mounting shafts 64 and 65 cooperate with larger holes 66 and 67 in support plate 51 and larger holes 68 and 69 in blade holders 56 and 57, respectively, to limit the motion of the guided elements. Precision guiding means are provided by a protrusion 71 on blade holder 57 which mates with guide slot 72 in blade holder 56. Holes 70 in support plate 51 permit the ends 3 and 4 of the twisted wire pair to pass through.

Figure 8:
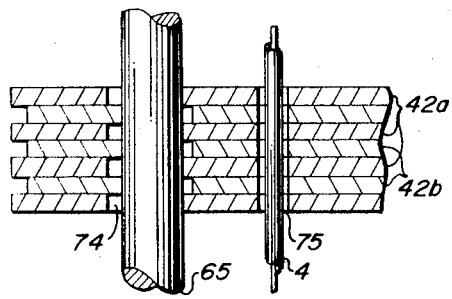
FIGS. 8 and 9 illustrate the wire gripping arrangement.
Figure 9:
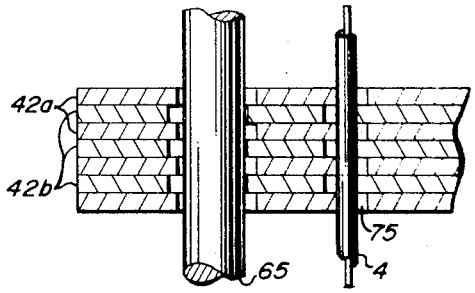

The wire cutter 43 is of the same construction as insulation cutter 41, except that the blades 58 and 59 are formed with straight cutting edges. Spacers 42a and 42b (FIGS. 8 and 9) are of the same shape as support plate 51. These spacers are supported on the mounting shafts 64 and 65, fixed to wire guide cylinder 29, which pass through elongated holes 73 and 74. The ends of the twisted wire pair, 3 and 4, pass through holes 75. The separators 42a and 42b are biased by a C-spring to the staggered positions shown in FIG. 8. When so positioned, the holes 75 are aligned so that the wire passes through easily, as seen in FIG. 8. When actuator elements 81 and 82 close in, the separator plates 42a and 42b are aligned and the wires 3 and 4 are firmly held for insulation cutter 41 and wire cutter 43. The number of separator plates employed is selected in accordance with the desired length of stripped wire.

Wire guiding assembly 30 and assembly 40 are aligned for cutting by means of a cam shaft 76 (FIG. 6) on the wire guide cylinder 29 (FIG. 5) and a cam roller 77 which is pressed against the cam surface by a pneumatic actuator 79 under control of valve 104. Clutch 9 permits wire guide cylinder 29 to rotate. Gripper blocks 81-84 are driven against the cutter-stripper assembly 40 by means of levers 85-88 and pneumatic actuator 90, under control of valve 106. Another actuator 92 drives levers 87 and 88 to the position 46 shown in FIG. 1 to provide the desired stripping action, by moving gripper blocks 83 and 84, which grip separators 42a and 42b and wire cutter 43, relative to gripper blocks 81 and 82, under control of valve 105.

In order to enable the introduction and removal of the twisted wire pair 3 and 4 into the machine, the feed roller 21 and its shaft 19 are mounted on a lever arm 94 which is controlled by actuator 95. This makes the engagement of feed rollers 21 and 22 selectable by opening the valve 103 so that actuator 95 drives the rollers together.

Figure 10:
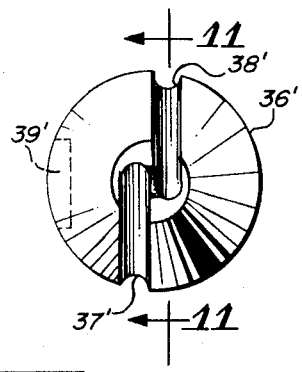
FIGS. 10-12 illustrate an alternative form of the separator element.
Figure 11:
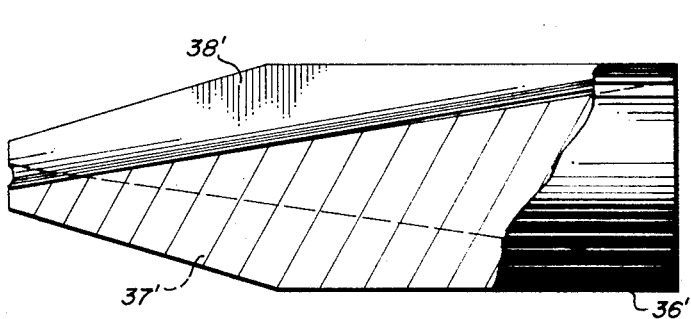
Figure 12:
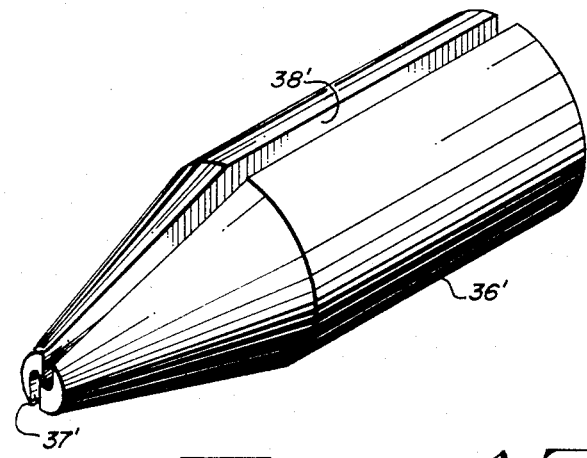
Figure 13:
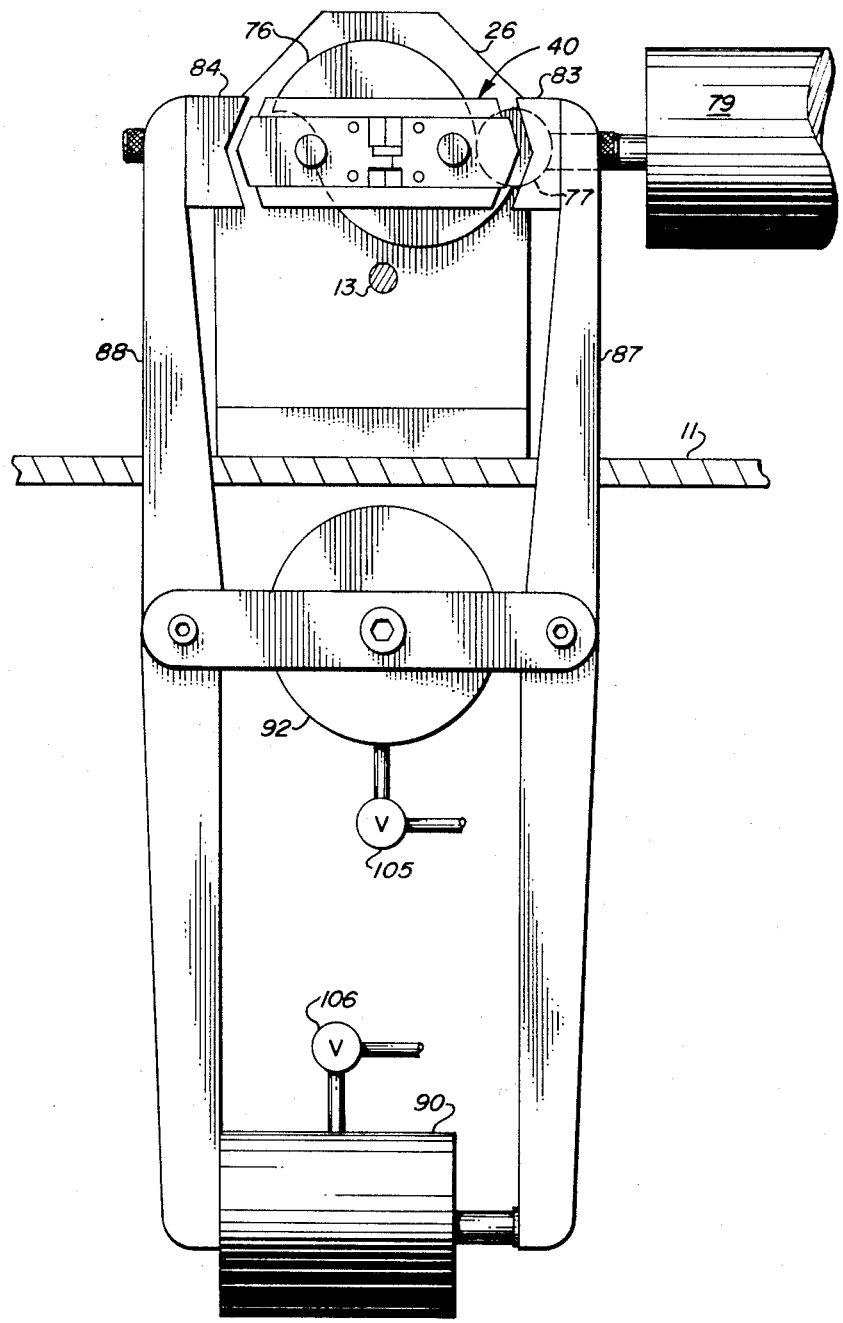
FIG. 13 is an end view, opposite to that of FIG. 6, of the FIG. 1 device.

FIGS. 10-12 illustrate an alternative form of the separator element 36' having offset grooves 37' and 38'.

Figure 5:
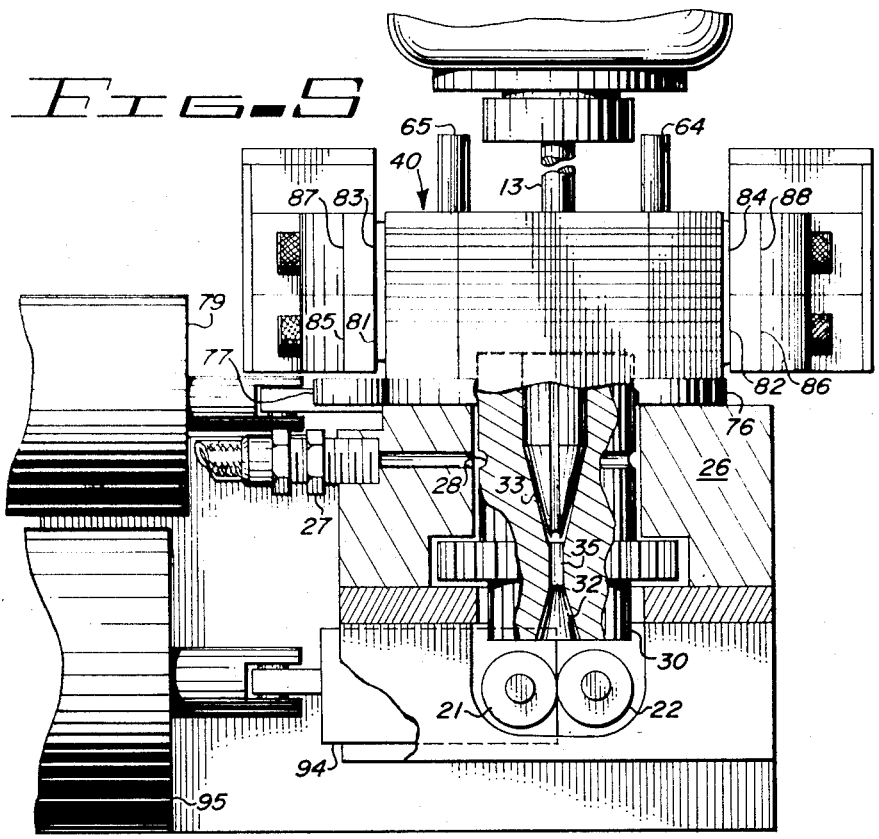
FIG. 5 is a top view of the FIG. 1 device.

The operation of the device is as follows. The ends of twisted wire pair 3 and 4 from cable 2 are pushed into conical opening 32 of wire guide cylinder 29 until they touch the saddle 36A while roller 21 is disengaged from feed roller 22 (FIG. 5). A foot actuated switch 101 starts motor 12 and causes actuator 95 to engage feed rollers 21 and 22 with the twisted wire pair between the rollers. Motor 12, through clutch 9 shaft 13, gears 24 and 25 rotates wire guide cylinder 29 and assembly 40 attached thereto. At the same time, motor shaft 13, through worm gear 14, drives gear 15, shaft 16, and meshing gears 17 and 18 (FIG. 3) so that feed rollers 21 and 22 feed the twisted wire pair through the wire guiding assembly 30 and cutter-stripper assembly 40. The different gear ratios for these drives allow for the elongation of the end of the twisted wire pair after untwisting. Wire feeding is then continued until the operator observes the wire ends projecting from assembly 40, at which time the motor 12 is stopped.

The wire guiding assembly 30 and cutter-stripper assembly 40 are then aligned by actuator 79 driving against cam 76. Then actuator 90 drives levers 85-88 so that gripper blocks 81-84 engage the cutter-stripper assembly 40. This causes the wire cutter 43 to remove the wire ends and causes the insulator cutter 41 to perforate the wire insulation. The actuator 92 then drives levers 87 and 88, thereby stripping the wire ends. The spacers 42a and 42b retain a grip on the insulation due to actuator 90. The actuator 90 is then retracted so that the twisted wire pair ends can be manually removed from the machine. After actuator 92 is retracted, air is supplied through manifold 28 so as to remove the stripped insulation from cutter-stripper assembly 40.

It is understood that the invention should not be construed as being limited to the form of embodiment described and shown herein as many modifications may be made by those skilled in the art without departing from the scope of the invention.

What is claimed is:

1. Apparatus for untwisting and stripping the ends of a twisted wire pair comprising:
   A. a rotatable assembly having an opening for receiving a twisted wire pair;
   B. engagable feed means for applying a twisted wire pair to said rotatable assembly opening;
   C. drive means, for rotating said rotatable assembly and advancing said feed means;
   D. starting means for selectively engaging and disengaging said feed means with a twisted wire pair;
   E. said rotatable assembly having a pair of channels through which respective wires of said twisted wire pair are driven by said feed means;
   F. cutter means, adjoining said rotatable assembly, for selectively cutting the insulation on the twisted wire pairs protruding from said rotatable assembly;
   G. aligning means, engagable with said rotatable assembly, for aligning the protruding twisted wire pair ends for cutting;
   H. actuator means, connected to the cutter means, for stripping the wire insulation.

2. The apparatus of claim 1, further comprising:
   I. a separator inserted in said rotatable assembly for forming wire receiving grooves and having a saddle shaped tip which separates the ends of a twisted wire pair.

3. The apparatus of claim 1, further comprising:
   I. a set of wire gripping slides, mounted on said rotatable assembly, having aligned offset holes for receiving separated ends of wire pairs;
   J. actuator means for driving said wire gripping slides into a wire gripping position.

4. Untwisting apparatus comprising:
   A. a rotatable wire assembly having
      i. a wire pair receiving opening,
      ii. a pair of passageways adapted to pass single wires therethrough and having a saddle shaped junction for separating the wires of a wire pair,
      iii. an interconnecting passageway between said receiving opening and said pair of passageways;

B. a motor connected to rotate said wire guide assembly;

C. a first feed roller, also connected to said motor, for rotation;

D. a second feed roller, engagable with said first feed roller for selectively feeding a wire pair into said wire pair receiving opening;

E. a feed actuator for selectively engaging said second feed roller with said first feed roller;

F. a centering cam fixed to said wire guide assembly for positioning the assembly such that said pair of passageways are aligned vertically;

G. an insulation cutter, mounted on said wire guide assembly adjacent thereto, having
  i. a base plate with two holes aligned with said pair of passageways,
  ii. a pair of opposed insulation cutter blades slidably mounted on said base plate,
  iii. means to bias said insulation cutter blades apart, H. an insulation cutter actuator arranged to drive said insulation cutter blades together;

I. a set of insulation gripping slides, mounted on said wire guide assembly, which are arranged to pass wire pairs from said pair of passageways through a pair of off center holes;

J. a pair of opposed wire cutter blades, mounted on said wire guide assembly adjacent to said insulation gripping slides;

K. a wire cutter actuator arranged to drive said wire cutter blades together and to drive said gripping slides into an insulation gripping position;

L. a wire stripping actuator, arranged to move said wire gripping slides axially in respect to said wires whereby the insulation is stripped from wire ends.

* * * * *